३,159,659
CYCLOPENTADIENYL METAL DIENE COMPLEXES
Roy L. Pruett, Charleston, and William R. Myers, St. Albans, W. Va., assignors to Union Carbide Corporation, a corporation of New York
No Drawing. Filed Aug. 31, 1962, Ser. No. 220,892
9 Claims. (Cl. 260—429)

This invention relates to novel cyclopentadienyl metal diene complexes. More particularly, this invention relates to novel complexes of cobalt, rhodium, and iridium wherein the metal is bonded to a cyclopentadienyl radical and to a conjugated diene ligand.

The novel complexes of the present invention are of the general formula:

RMY wherein R is a cyclopentadienyl, alkylcyclopentadienyl, or arylcyclopentadienyl radical; wherein M is cobalt, rhodium, or iridium; and wherein Y is an acyclic conjugated diene ligand. The acyclic conjugated diene ligands of the novel complexes are characterized by the presence therein of a

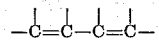

unit and preferably contain 12 carbon atoms or less.

Illustrative R variables in the above formula include methylcyclopentadienyl, ethylcyclopentadienyl, n-butylcyclopentadienyl, n-hexylcyclopentadienyl, phenylcyclopentadienyl, naphthylcyclopentadienyl, and the like. Of the alkylcyclopentadienyls, those wherein the alkyl substituent contains from 1 to 6 carbon atoms are preferred.

Illustrative acyclic diene ligands are, for example, the conjugated alkadienes, such as 1,3-butadiene, isoprene, 1,3-pentadiene, 2,3-dimethylbutadiene-1,3, 1,3-hexadiene, 2,4-octadiene, 2-methylpentadiene-1,3, and the like; and the alkoxy substituted conjugated alkadienes, such as 2-methoxybutadiene-1,3, 2,3-dimethoxybutadiene-1,3, 2-methoxy-3-ethoxypentadiene-1,3, and the like. The conjugated alkadienes which contain from 4 to 8 carbon atoms are highly preferred.

Illustrative novel cyclopentadienyl metal diene complexes include, for example, cyclopentadienyl cobalt 1,3-butadiene, n-butylcyclopentadienyl cobalt 1,3-butadiene, cyclopentadienyl rhodium 1,3-butadiene, cyclopentadienyl iridium 1,3-butadiene, methylcyclopentadienyl cobalt, 1,3-butadiene, phenylcyclopentadienyl cobalt 1,3-butadiene, cyclopentadienyl cobalt 1,3-pentadiene, cyclopentadienyl cobalt 2,3-diethylbutadiene-1,3, cyclopentadienyl rhodium 1,3-pentadiene, methylcyclopentadienyl iridium 1,3-octadiene, and the like.

The novel complexes of the present invention can be prepared by contacting a cyclopentadienyl metal compound, hereinafter described in detail, with an excess of the desired conjugated diene at elevated temperatures and for a period of time sufficient to produce the novel complex.

Among the cyclopentadienyl metal compounds which are suitable for the preparation of the novel complexes are, for example, bis(cyclopentadienyl), bis(alkylcyclopentadienyl) and bis(arylcyclopentadienyl) compounds of cobalt, rhodium and iridium. Illustrative compounds include dicyclopentadienyl cobalt, dicyclopentadienyl rhodium, dicyclopentadienyl iridium, bis(methylcyclopentadienyl) cobalt, bis(ethylcyclopentadienyl) rhodium, bis(n-propylcyclopentadienyl) iridium, bis(phenylcyclopentadienyl) cobalt, and the like.

The reaction mechanism is thought to involve the formation of an active intermediate which contains a 1,3-cyclopentadiene ligand and the subsequent replacement of said ligand by the acyclic conjugated diene. The cyclopentadienyl metal 1,3-cyclopentadiene intermediate can be formed in situ by the reaction of the bis(cyclopentadienyl)metal reactant and the conjugated diene reactant. For example, the reaction of bis-(cyclopentadienyl)cobalt with 1,3-butadiene yields a transient intermediate which under the reaction condition is converted to cyclopentadienyl cobalt 1,3-butadiene, one of the novel compounds of the invention.

The formation of the cyclopentadienyl metal 1,3-cyclopentadiene intermediate in situ is facilitated by adding to the reaction mixture an active halogen-containing compound, such as a monohalogenated conjugated alkadiene. For example, in the preparation of cyclopentadienyl cobalt 1,3-butadiene by the reaction of dicyclopentadienyl cobalt and 1,3-butadiene, higher yields are obtained when the reaction is conducted in the presence of chloroprene than when no chloroprene is added to the reaction mixture.

Alternatively, one may use as reactants for the preparation of the novel complexes, cyclopentadienyl metal 1,3-cyclopentadiene compounds, i.e., compounds which already contain the reactive 1,3-cyclopentadiene ligand. Illustrative of the above compounds are, for example, cyclopentadienyl cobalt 1,3-cyclopentadiene, methylcyclopentadienyl cobalt 1,3-cyclopentadiene, cyclopentadienyl cobalt 1-benzoylcyclopentadiene-1,3, ethylcyclopentadienyl rhodium 1,3-cyclopentadiene, phenylcyclopentadienyl cobalt 1-acetylcyclopentadiene-1,3, methylcyclopentadienyl iridium 1,3-cyclopentadiene, and the like.

In general, whether the cyclopentadienyl metal 1,3-cyclopentadiene compound is used as the reactant or whether such cyclopentadienyl metal 1,3-cyclopentadiene is produced in situ, the nature of the substituent(s) on the 1,3-cyclopentadiene ligand is not critical. Therefore the substituents can be alkyl, acyl, aryl, alkoxy, aryloxy, and other radicals which are substantially non-reactive with respect to the reactant(s) and the product(s) under the reaction conditions.

The reaction of the cyclopentadienyl metal compound with the conjugated diene is accomplished by contacting said metal compound with the conjugated diene at elevated temperatures, and, if desired, in the presence of an active halogen-containing compound.

In general, the molar ratio of the dienic reactant to the cyclopentadienyl metal reactant is higher than about 1 to 1 and is preferably in the range of from about 5 to 1 to about 20 to 1, and higher. For optimum results, the particular cyclopentadienyl metal compound employed, the operative conditions under which the reaction is conducted, and other factors, will largely determine the preferred molar ratio.

The reaction preferably occurs in the liquid phase, and to this extent sufficient pressure is employed to maintain an essentially liquid reaction mixture whether or not an inert normally-liquid organic vehicle is employed. In general, pressures in the range of from about 1 to about 100 atmospheres, or higher, can be employed. Preferably, the reaction is carried out under superatmospheric pressures, for example, of from about 6 to about 60 atmospheres.

Since most cyclopentadienyl metal reactants described supra are substantially soluble in the liquid dienic reactant, usually a homogeneous liquid phase reaction mixture is obtained under the operative conditions of the process. If necessary, a solvent which is inert with respect to the reactants and products may be employed to bring about the desired homogeneity. Illustrative of the inert normally-liquid organic solvents are the aromatic hydrocarbons, e.g., benzene, toluene, and the like; and the aliphatic saturated hydrocarbons, e.g., hexane, heptane, and the like.

The reaction can be conducted over a wide temperature range. Depending upon various factors such as the particular reactants employed, the ratio of the reactants, and the like, the reaction temperature may be as low as 50° C., and lower, and as high as 200° C., and higher. A reaction temperature in the range of from about 90° C. to about 140° C. is preferred.

In general, the reaction is conducted for a period of time sufficient to produce the desired complex and such reaction time will vary depending on the operative temperature, the nature of the reactants, and the like. It has been observed that desirable results can be obtained by conducting the reaction for a period of time ranging from about 1 to about 10 hours.

The process can be executed in a batch, semi-continuous, or continuous fashion. The reaction vessel can be a glass vessel, steel autoclave, elongated metallic tube, or other equipment and material employed in the art provided that such equipment is able to withstand the reaction pressures and that the reactants and products are not sensitive to this material of construction. The order of addition of reactants does not appear to be critical. A suitable procedure is to dissolve the desired amount of cyclopentadienyl metal compound in the liquid diene or in a liquid admixture containing the diene, the active halogen-containing compound and, if desired, a solvent. The resulting admixture is then introduced into the reaction zone under a nitrogen atmosphere.

The novel complexes of the present invention can be recovered from the reaction product mixture by conventional techniques such as distillation or sublimation under reduced pressures. The novel complexes of the invention are useful as anti-knock agents in motor fuels and as catalysts for the selective dimerization of conjugated dienes.

The following examples are illustrative:

*Example 1*

(A) To a three-liter pressure vessel there were charged 50 grams of dicyclopentadienyl cobalt and 954 grams of 1,3-butadiene. The vessel was closed and heated to a temperature of 130±5° C. for a period of about 15 hours. The vessel and contents were cooled to room temperature, i.e., about 24° C., the unreacted 1,3-butadiene was vented, and the reaction product mixture was subjected to distillation under reduced pressure. After all the dimeric product was removed, a red solid appeared on the condenser walls. The condenser was then replaced by an ice-cooled finger and the pressure was reduced to about 0.05–0.10 mm. of mercury. Upon warming the residue to about 35° C., 5 grams of a red solid collected on the cold finger.

The product, cyclopentadienyl cobalt 1,3-butadiene, is a volatile red solid, soluble in organic solvents, insoluble in water, which melts, under nitrogen, at a temperature of 103–105° C. It slowly decomposes in air. Elemental analysis for carbon and hydrogen and infrared spectroscopy confirmed the above formulation.

(B) In an analogous manner as above, when dicyclopentadienyl rhodium is reacted with 1,3-butadiene, there is obtained cyclopentadienyl rhodium 1,3-butadiene.

(C) In an analogous manner as above, when dicyclopentadienyl iridium is reacted with 1,3-butadiene, there is obtained cyclopentadienyl iridium 1,3-butadiene.

*Example 2*

To a 500 ml. pressure vessel there were charged 139 grams of 1,3-butadiene and 24 grams of cyclopentadienyl cobalt 1-benzoylcyclopentadiene-1,3. The vessel was purged with nitrogen, sealed and heated, while rocking, to a temperature of about 140° C. for a period of about three hours.

The vessel and contents were cooled to room temperature, i.e., about 24° C., the unreacted 1,3-butadiene was vented, and the reaction product mixture was distilled at a pressure of 3–4 mm. of mercury. After all the dimeric product was removed, the cyclopentadienyl cobalt 1,3-butadiene was collected by sublimation and condensation onto a cold finger. The yield of red solid was 10 grams, or 69 percent of theory.

*Example 3*

To a 500 ml. pressure vessel there were charged, under a nitrogen atmosphere, 10 grams of cyclopentadienyl cobalt 1-benzoylcyclopentadiene-1,3 and 200 grams of isoprene. The vessel and contents were placed on a platform rocker and heated, while rocking, to a temperature of about 140° C. for a period of about three hours.

The vessel and contents were cooled to room temperature, i.e., about 24° C., and the unreacted isoprene and the dimeric products removed by distillation under reduced pressure. Further distillation of the residue at a temperature of 75° C. and a pressure of 11 mm. of mercury yielded cyclopentadienyl cobalt isoprene.

*Example 4*

To a 500 ml. pressure vessel there were charged, under a nitrogen atmosphere, 10 grams of cyclopentadienyl cobalt 1-benzoylcyclopentadiene-1,3 and 20 milliliters of 1,3-pentadiene. The vessel and contents were placed on a platform rocker and heated, while rocking, to a temperature of about 140° C. for a period of about three hours.

The vessel and contents were cooled to room temperature, i.e., about 24° C., and the unreacted 1,3-pentadiene and dimeric products removed by distillation under reduced pressure. Further distillation of the residue at a temperature of 87° C. and at a pressure of 1 mm. of mercury yielded cyclopentadienyl cobalt 1,3-pentadiene.

*Example 5*

To a 500 ml. pressure vessel there were charged, under a nitrogen atmosphere, 18.9 grams of dicyclopentadienyl cobalt, 17.8 grams of a 50 percent solution of chloroprene in xylene, and 170 milliliters of 1,3-butadiene. The vessel and contents were placed on a platform rocker, sealed, and heated, while rocking, to a temperature of about 135° C. for a period of four hours.

The vessel and contents then were cooled to room temperature, i.e. about 24° C., the excess 1,3-butadiene was vented, and the reaction product mixture was transferred to a stripping flask. After the liquid components were removed by distillation under reduced pressure, the cyclopentadienyl cobalt 1,3-butadiene (4 grams) was isolated by sublimation onto a cold finger.

Although the invention has been illustrated by the preceding examples, the invention is not to be construed as limited by the materials employed in the above examples, but rather the invention encompasses the generic area as hereinbefore disclosed. Various modifications and embodiments of this invention can be made without departing from the spirit and scope thereof.

What is claimed is:

1. A class of compounds of the general formula:

$$RMY$$

wherein R is selected from the group consisting of cyclopentadienyl, alkylcyclopentadienyl, and arylcyclopentadienyl; wherein M is a metal selected from the group consisting of cobalt, rhodium, and iridium; and wherein Y is an acyclic conjugated diene ligand.

2. Cyclopentadienyl cobalt conjugated alkadiene compound, the conjugated alkadiene ligand of which contains from 4 to 12 carbon atoms.

3. Alkylcyclopentadienyl cobalt conjugated alkadiene compound, the alkyl radical of which contains from 1 to 6 carbon atoms and the conjugated alkadiene ligand of which contains from 4 to 12 carbon atoms.

4. Arylcyclopentadienyl cobalt conjugated alkadiene compound, the conjugated alkadiene ligand of which contains from 4 to 12 carbon atoms.

5. Cyclopentadienyl cobalt 1,3-butadiene.

6. Cyclopentadienyl rhodium 1,3-butadiene.
7. Cyclopentadienyl iridium 1,3-butadiene.
8. Cyclopentadienyl cobalt isoprene.
9. Cyclopentadienyl cobalt 1,3-pentadiene.

References Cited in the file of this patent
UNITED STATES PATENTS 2,818,416   Brown _____ Dec. 31, 1957

OTHER REFERENCES

King et al.: J.A.C.S., vol. 83, Sept. 5, 1961, pp. 3593–3597.